March 17, 1953 F. ASHWORTH 2,631,555
SHOE MACHINE

Filed May 28, 1949 5 Sheets-Sheet 1

Fig. 1

Inventor
Fred Ashworth
By his Attorney

March 17, 1953   F. ASHWORTH   2,631,555
SHOE MACHINE
Filed May 28, 1949   5 Sheets-Sheet 2

Inventor
Fred Ashworth
By his Attorney

March 17, 1953    F. ASHWORTH    2,631,555
SHOE MACHINE
Filed May 28, 1949    5 Sheets-Sheet 4

Inventor
Fred Ashworth
By his Attorney

March 17, 1953  F. ASHWORTH  2,631,555
SHOE MACHINE

Filed May 28, 1949  5 Sheets-Sheet 5

Inventor
Fred Ashworth
By his Attorney

Patented Mar. 17, 1953

2,631,555

UNITED STATES PATENT OFFICE 2,631,555

SHOE MACHINE

Fred Ashworth, Wenham, Mass., assignor to United Shoe Machinery Corporation, Flemington, N. J., a corporation of New Jersey Application May 28, 1949, Serial No. 96,003

14 Claims. (Cl. 112—46)

The present invention relates to improvements in machines for operating upon stitchdown shoes in which a welt is sewed or otherwise attached to the outturned upper and projecting margin of an outsole while the parts operated upon are supported upon a last, the leading end of the welt being presented to the stitch forming devices in starting a new seam and being severed automatically in a novel manner without special manual operations to provide an accurately formed joint between the leading and trailing ends of the welt. A sewing machine of the type referred to is disclosed in United States Letters Patent No. 2,388,245, granted November 6, 1945 upon application of the present inventor.

In the sewing machine of the patent noted, a welt cutting knife is provided acting to sever the welt in the first part of a sewing cycle before the stitch forming devices engage the shoe one stitch ahead of the final stitch of the seam. Thereafter the shoe being sewn is advanced the length of the two stitches, the one being inserted and the final stitch. The machine then is brought to rest with the stitches in which the knife is actuated intersecting the beveled cut surfaces at the abutting ends of the welt, the final stitch crossing the feather edge the extreme final end of the welt to secure the final end against separation from the end first sewed to the shoe. For actuating the welt cutting knife in a manner to avoid interference of the knife with the stitch forming devices at the first part of a sewing cycle before the stitch forming devices engage the shoe, extremely accurate timing is required. In the operation of the patented machine, it has been found that the necessity for accurate timing to avoid interference between the welt cutting knife and the awl is occasionally a handicap. For uniformly reliable operation of the machine, so much attention of the operator is required in maintaining accurate timing and adjustment that the advantage of severing the welt automatically is offset to a substantial degree.

One object of the present invention is to provide a shoe sewing machine of the type disclosed in the patent in which the welt is severed automatically at the end instead of the first part of a sewing cycle, arranged in such a way that the necessity of accurate timing between the operation of a welt severing knife and the stitch forming devices is substantially reduced if not entirely avoided. A further object is to assist effective operation of a welt severing knife in a machine of this type, so that complete and reliable separation of the ends of the welt will be insured. Otherwise, the final stitch of the seam will intersect the incompletely severed welt end before the machine stops and will prevent removal of the shoe being sewn from the machine. Other objects of the invention are to improve the operation of a shoe sewing machine of the above noted type, both in the construction and arrangement of its welt knife actuating mechanism and in the avoidance of the difficulties in operation and in other respects as hereinafter pointed out. In certain of its aspects the invention is applicable to a machine constructed to attach a welt by an operation other than sewing.

Accordingly, an important feature of the present invention resides in a sewing or other attaching machine having a guide for directing a welt into position on a work piece in advance of the operating point, a stop mechanism for bringing the machine to rest with the attaching devices disengaged from the work, and a knife acting against a portion of the welt directly in contact with the work to sever the welt completely at the latter part or end of an operating cycle in advance of the seam end after the attaching devices have been disengaged from the work in that operating cycle so that there is no chance of their interference with the cutting stroke of the knife, the stop mechanism being operatively connected to a counting finger provided with two detent surfaces to prevent the machine from being brought to rest until two complete sewing cycles of operation have been completed beyond the severed end of the welt.

In carrying out this feature of the invention with a sewing machine, as hereinafter described, it has been found necessary to insert a stitch after actuating the knife in addition to the one in formation at the time the knife is actuated, the stitch inserted during the cycle in which the knife is actuated being completed before the actuation of the knife. Since the stitch of that cycle is already completed the knife must be actuated after relative feed movement between the work and the knife to avoid severing the threads of the stitch thus formed, the relative feeding movement of the work and knife defining the cycle.

In the patented machine the welt severing knife reciprocates along a path at an angle to the length of the welt, tending to impart a lengthwise component of movement to the welt during the severing stroke of the knife. The component movement of the welt during operation of the knife tends to displace the welt on the work or to cause it to be compressed along its length against the work in such a way that it may not be completely cut through. During the succeeding stitch any uncut section of the welt will continue to draw welt from the supply along with the shoe until the succeeding stitch intersects it beyond the cut. When the sewing operatiton is completed under such conditions it is necessary for the operator to tear the welt remaining in the machine loose from the final stitch as well as to break the uncut section before removing the shoe from the machine.

In the illustrated embodiment of the invention, the welt is gripped during severing at a location between the point of operation on the work and the supply so that no component movement of the welt with the knife will be permitted and the welt will be severed with certainty by the knife. In this feature of the invention, mechanism is provided for causing the grip to be retained on the welt while the additional stitches are being inserted. Preferably, the gripping means releases the welt after the seam has been completed to enable the work readily to be disengaged from the machine. As hereinafter described, the shoe which comprises the work is clamped in the machine by a work support and a presser foot and the presser foot is actuated to disengage the shoe before the welt finally is released at the end of a steam.

While these features of the invention are particularly useful in machines for sewing welts to stitchdown shoes the general construction and arrangement of parts also is advantageous in use with types of sewing machines other than those designed for operation on shoes and even in machines where step-by-step attaching operations other than sewing are performed.

These and other features of the invention consist in the novel and improved devices, combinations and arrangements of parts hereinafter described and claimed, the advantages of which will be readily understood from the following description taken in connnection with the accompanying drawings, in which

The machine illustrated in the drawings is an outsole shoe sewing machine constructed and arranged to insert a lockstitch outseam and is similar, except as hereinafter described, to the machine disclosed in United States Letters Patent No. 2,271,611, granted February 3, 1942, upon an application filed in the names of the present inventor and Carl F. Whitaker, as well as being similar to the machine disclosed in inventor's prior patent above identified, to which reference may be had for a more complete description. In the machine of inventor's prior Patent No. 2,388,245 a welt is directed into a position on a shoe in advance of the operating point and at the end of the sewing operation the welt is severed by a knife acting along a portion of the welt in direct contact with the shoe, at least two stitches in advance of the end of the seam, the knife being timed to sever the welt during the first part of the next to last sewing cycle, just before relative feed movement of the shoe and knife takes place. The seam is sewn in such manner that the next to last stitch is inserted after the knife is actuated and intersects the cut ends of the welt, the last stitch being inserted clear of the last end of the welt so that an exposed thread of the last stitch crosses the final end of the welt to hold it securely in place. The machine of the present application, as in that of Patent No. 2,388,245, inserts two stitches after the welt has been severed but does so by severing the welt during the third to last sewing cycle, each sewing cycle being defined by the relative feed movement between the shoe and the knife. In the present and patented machines the relative feed movement between the shoe and the knife occurs during back feed of the work support.

To improve the operation of cutting the welt at the end of a seam and to provide more reliable mechanism for actuating the welt cutting knife, according to a feature of the present invention, the knife is constructed and actuated in timed relation to the stitch forming devices during the third to last stitch of a series of four stitches to sever the welt along a portion thereof clamped in contact with the shoe in that part of the sewing cycle defined by the relative feed movement in which the stitch has been formed to the point of drawing a loop through the substance of the work and the stitch forming devices have been disengaged from the work in that sewing cycle. In this way the time of actuation of the knife occupies that part of the third to last sewing cycle in which the stitch is being completed and set within the substance of the work and before relative feed movement of the work takes place on the work support, the stitch forming devices being free of the work. Thus, the sewing cycle in which the welt cutting knife acts cannot be included with those required to insert the last two stitches of the seam, one of which intersects the cut ends of the welt. Accordingly, a counting mechanism is provided in the present machine which insures the insertion of a complete four stitch series at the end of a seam after the driving mechanism for the machine is actuated by releasing the usual foot controlling treadle instead of a three stitch series as in the machine of Patent No. 2,388,245. The first of the four final stitches inserted by the present machine after the controlling treadle is released is for the purpose of providing time for setting the knife actuating mechanism in operation, the second of the final four stitches is the one in which the welt actually is severed by the knife and the final two remaining stitches, as above noted, are for the purpose of securing the end of welt in place on the shoe.

Figure 16:
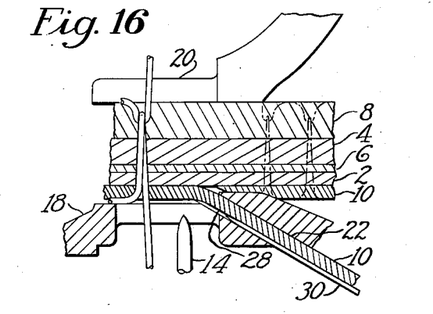
Fig. 16 is a sectional view on a still further enlarged scale of the projecting marginal portions of a shoe as they would appear from the front of the machine during the approach of the end of an outseam after the first of the four final stitches of the seam has been inserted, corresponding to the positions of the parts in Fig. 13, the work support, presser foot and awl being shown in their respective relationships with the work.
Figure 17:
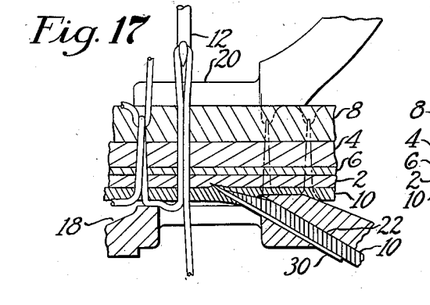
Fig. 17 is a similar view of the same parts taken during the insertion of the second of the four final stitches at a time in that sewing cycle when the welt cutting knife is acting, the needle being shown drawing a loop of thread through the work.

The illustrated machine is constructed for operation upon a stitchdown shoe provided with an upper, indicated at 2, in Fig. 16 et al. having an outturned margin, an insole 4 including a sock lining 6, an outsole 8 and a finish welt 10. After severing the welt from the supply in the machine the ends of welt are brought into engagement with each other on the shoe and are formed with bevel cuts to provide a smooth scarf joint.

Referring more particularly to the drawings, the machine comprises the usual stitch forming and work feeding devices including a curved hook needle 12, a curved awl 14, a rotary shuttle 16 (see Fig. 1) for passing each loop of needle thread about a locking thread case, and a work feeding work support 18 and presser foot 20 for clamping the welt against the shoe during operation of the stitch forming devices. To direct the welt 10 into a position on the outturned upper of a stitchdown shoe in advance of the sewing point the work support 18 is provided with a welt guide 22 (see Fig. 16 et al.) comprising a welt receiving slot in that edge of the work support first engaged by the advancing marginal portions of the shoe.

To start new sewing operations the welt is advanced across the sewing point in the illustrated machine by a welt clamp comprising a lever 24 mounted on a sliding block 26 movable in a direction parallel to the welt. At the end of the sewing operation the welt is severed in contact with the shoe. For this purpose the welt guide 22 has lateral slots 28 (see Fig. 16 et al.) formed therein, within which is slidably mounted a welt cutting and beveling knife 30 acting against the outflanged portion of the shoe upper 2 as a cutting block in advance of the point of operation of the stitch forming devices. As thus far described, the machine of the present invention is generally the same as that of the patented construction. As in the patented machine the present machine is provided with a driving and stopping mechanism controlled by a foot treadle for bringing the machine to rest at the end of a seam and for releasing the shoe from the clamping action of the presser foot. After the foot treadle has been released to bring the machine to rest, a complete sewing cycle is performed before the knife actuating mechanism is set into operation. It is not until the next succeeding sewing cycle that the welt actually is severed and thereafter two additional stitches are then required to complete a seam, one intersecting the bevel cut surfaces at the ends of the welt and the other crossing the feather edge at the extreme final end of the welt to secure the extreme final end against separation from the end already sewed to the shoe.

In the machine of the patent the welt is severed just before the insertion of the next-to-last stitch in the first part of its sewing cycle. With such arrangement the available time for severing the welt is so short that unless accurate adjustment is maintained there is danger of injurious contact between the awl and the welt cutting knife.

To avoid danger of contact between the awl and the welt cutting knife of the machine embodying the present invention, the operation of the welt cutting knife is delayed in the sewing cycle during which it is actuaed, until after the needle has been disengaged from the work. In delaying the time in a sewing cycle at which the welt cutting knife acts, however, the relationship between the work and the knife is changed as a result of the work feeding action of the work support and presser foot and the relative movement of the work with the work support. Therefore, the knife acts on the welt ahead of the point at which the stitch being formed is inserted. It is for this reason that two further stitches must be inserted to accomplish the intended results, making four stitches in all between the time the control treadle is released and the time the machine is finally brought to rest. Accordingly, in the illustrated machine instead of providing a counting mechanism to insure the insertion of three stitches the present machine is constructed with a four-stitch counting mechanism.

The present driving and stopping mechanism is substantially the same as that disclosed in Patent No. 2,271,611 and comprises high-speed and low-speed clutches (not shown) both mounted on a main sewing shaft 32 from which the stitch forming and work feeding devices are actuated by connected mechanisms. The high-speed clutch is directly controlled by suitable connections with a downwardly extending rod 34 (see Fig. 1) connected at its lower end to the treadle indicated at 35. When the treadle 35 is depressed the low-speed clutch is disengaged and the high-speed clutch engaged to drive the machine at regular sewing speeds.

Figure 11:
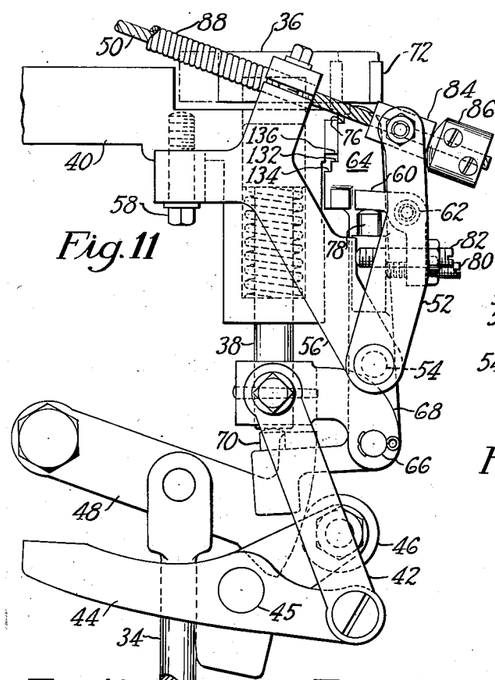
Fig. 11 is a detail side view on an enlarged scale, looking from the right, of a portion of the driving and stopping mechanism in the machine, together with means for counting the number of stitches inserted after the cutting knife severs the welt, the parts being illustrated in positions assumed while the machine is in normal running condition.
Figure 12:
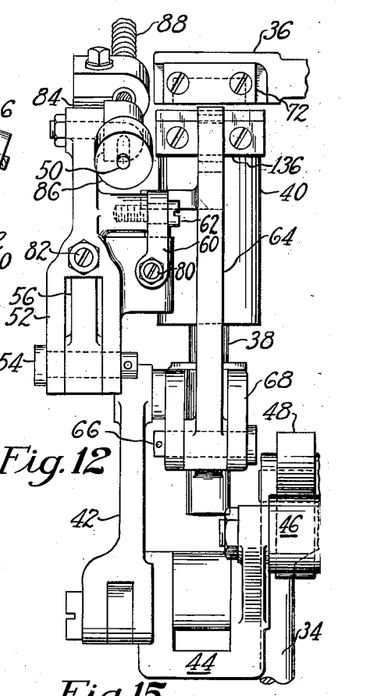
Fig. 12 is a view in rear elevation of the parts illustrated in Fig. 11.

The mechanism for engaging and disengaging the low-speed clutch includes a vibrating cam-actuated lever 36 (see Fig. 11 et al.) having one arm overlying a spring-pressed lock bolt 38 slidingly mounted in a horizontally movable carrier 40. The lock bolt is connected through a link 42 with one arm of a lever 44 fulcrumed at 45 on the machine frame. Another arm of the lever 44 has a roll 46 arranged in the path of a cam arm 48 to which the upper end of the treadle rod 34 is pivoted. The arrangement is such in the machine of Patent No. 2,271,611 that when the treadle is depressed the lock bolt is withdrawn from engagement with the vibrating lever 36 and the low-speed clutch is rendered inoperative while the machine is running at high speed. When the treadle is released the lock bolt re-engages the vibrating lever and at the proper time in its vibration enters a recess in the lever to cause the low-speed clutch to be thrown into operation, the machine thereupon being brought to rest after an additional complete sewing cycle.

In the machine of inventor's prior Patent No. 2,388,245 the vibrating lever, corresponding to the lever 36, is arranged to pull and release a cable in time to set the knife actuating mechanism in operation during the succeeding sewing cycle. In the present machine a similar cable is indicated at 50 and is connected at one end with a setting arm 52, the forked lower end of which is rotatable on a pivot 54. The pivot 54 is secured in a Y-shaped bracket 56 fixed to the lock bolt carrier 40 by a bolt 58, the forked portion of the arm embracing the bracket. The setting arm 52 is actuated by the counting mechanism.

The counting mechanism for actuating the setting arm consists of a latch 60 pivotally mounted on a screw 62 near the upper end of the setting arm, which latch is engaged by an abutment on a counting finger 64 during the first rearward movement of the counting finger. The counting finger is pivoted to swing about a pin 66 secured between the forked portions of a lug projecting from a collar 68 pinned to the lock bolt 38. The counting finger has a forwardly extending arm in which is slidably mounted a spring-pressed plunger 70 engaging the lower end of the lock bolt in the stopping mechanism and acting to hold the upper end of the counting finger yieldingly in engagement with the rearward face of the lock bolt carrier in the position shown in Fig. 11.

When the treadle is first released the upper end of the counting finger engages a wear plate 72 screwed to the rear surface of the vibrating lever to prevent engagement of the lock bolt with the vibrating lever until the proper time is reached. As soon as the vibrating lever moves forwardly sufficiently toward the dot-dash position of Fig. 11 to clear the upper end of the counting finger the lock bolt moves with the counting finger upwardly a short distance to enable the first one of two notches 74 and 76 to engage the plate 72. During the rearward movement of the vibrating lever toward the solid line position of Fig. 11 the counting lever is also moved rearwardly at its upper end, bringing the abutment thereon against the latch 60, pulling the flexible cable 50 with it and setting the knife actuating mechanism into operation. This occurs during the second of the four final stitches of a seam.

The latch 60 is in the form of a right angle lever having its latching end engaged by a spring-pressed plunger 78 mounted in the setting arm 52 and at its downwardly extending end the latch carries an adjustable set screw 80 acting against the rearward side of the projection on the setting arm in which the plunger is mounted. The setting arm 52 is adjustably located by a set screw 82 threaded into the arm, acting at its forward end on a surface of the bracket 56. To connect the cable 50 with the setting arm the cable passes loosely through a block 84 having a right angle stud projecting therefrom rotatably mounted in the upper end of the setting arm. To prevent escape of the cable from the block the rearward end is secured in a clamp collar 86. The cable operates within a sheath 88, one end of which is secured in a clamp at the upper end of the bracket 56 and the other end of which is secured to an upward projection on a knife actuating support 90, shown in Fig. 7 et al.

Figures 7, 8:
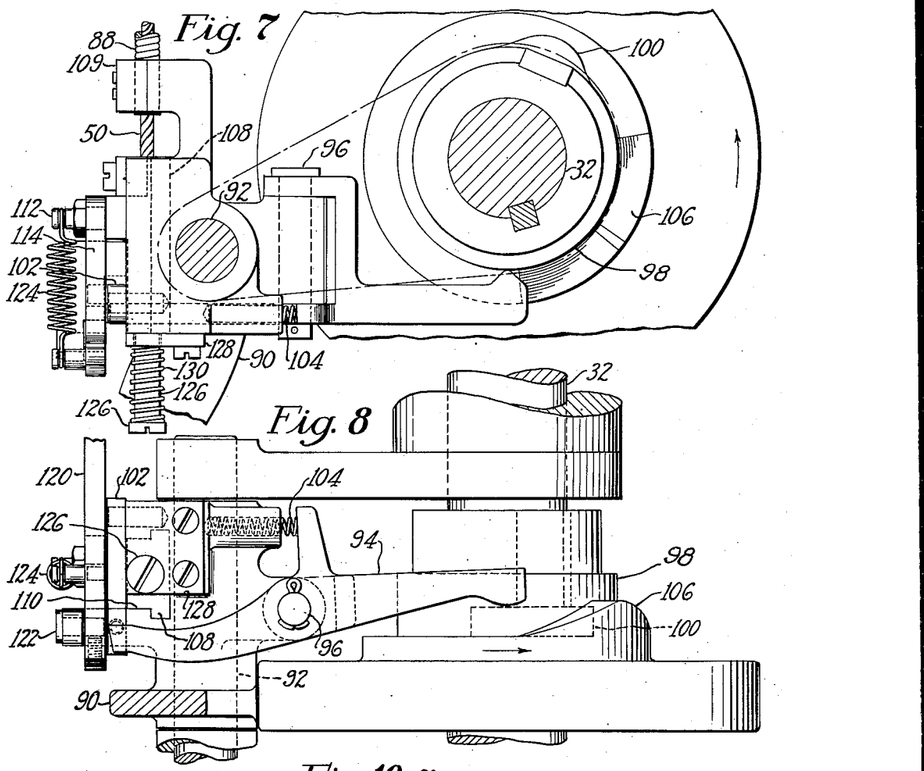
Fig. 7 is a detail sectional view on an enlarged scale, looking from the right, of the actuating mechanism for the welt cutting knife in the machine of Fig. 1.
Fig. 8 is a bottom plan view, partly in section, of the welt cutting knife actuating mechanism.

The welt cutting knife actuating mechanism includes the support 90 which is rotatably mounted for swinging movement on a horizontal shaft 92 and a rearwardly extending follower lever 94 fulcrumed on a vertical pin 96 secured in a lug formed on the support 90, the follower lever 94 being forked about the lug on the support and perforated to receive the pin. These parts are best shown in Figs. 7 and 8. The rearward arm of the follower lever engages a flanged cam disk 98 secured to the sewing shaft 32 and the cam disk has a radial projection 100 for depressing the follower lever when that lever is moved within its path of rotation. When the lever 94 is depressed it actuates the welt severing knife in a manner to be described.

To hold the welt severing knife mechanism inoperative during sewing, the follower lever 94 is locked out of the path of the projection 100 by connections including a latch 102 against the action of a spring 104 mounted within an opening in the support 90 and engaging a finger on the follower lever 94. When the follower lever is in the path of the projection 100 engagement of the projection with the lever actuates the knife to sever the welt. Thereafter during continued rotation of the sewing shaft the follower lever is engaged with a wedging surface 106 which moves the follower lever 94 laterally out of the path of the projection 100 and causes the latch 102 to relock the cam lever in inoperative position.

The cable 50 is connected to the latch 102 for releasing the follower lever 94 to set the knife actuating mechanism in operation. For this purpose the cable 50 is secured to a flanged slide block 108 mounted in a guideway 110 formed in an enlargement on the support 90. The sheath 88 of the cable is secured to the support 90 by a clamp 109 on an upwardly projecting arm of the support. The block 108 has projecting from it a stud 112 on which is rotatably mounted a hook member 114 yieldingly urged by a spring 116 against a forwardly projecting lug on the latch 102. The spring 116 is retained within a passage formed within the support 90 and acts at its upper end against a horizontal arm of the hook member and at its lower end against the latch 102 so that the spring serves a double purpose of maintaining the hook member in engagement with the lug on the latch in engagement with the follower lever 94. While the hook member engages the latch, retraction of the cable 50 disengages the latch from the cam lever, causing the cam lever to be set into the path of the projection 100. The welt severing knife is then actuated. Immediately thereafter the cam surface 106 forces the follower lever out of the path of the projection 100 and resets it. During retraction of the cable the projecting arm of the hook member 114 engages a pin 118 on the support 90 swinging the hook member about the stud 112 and releasing the latch 102 so that the follower lever may be reset.

After being disengaged from the latch the hook member is locked out of engagement with the latch 102. For this purpose the lower end of the hook member is retained by a shoulder on a manually actuated latch 120 clamped to a pin 122 rotatable in the lower front portion of the support 90 where it is readily accessible from the front of the machine. The manually actuated latch 120 is raised toward the hook member by a spring 124 stretched between the stud 112 and a pin on the latch 120. To limit the releasing movement of the latch 120 it is formed at its left end with a diagonally projecting lug arranged to engage the support when the latch is moved beyond the releasing position.

Figures 9, 10:
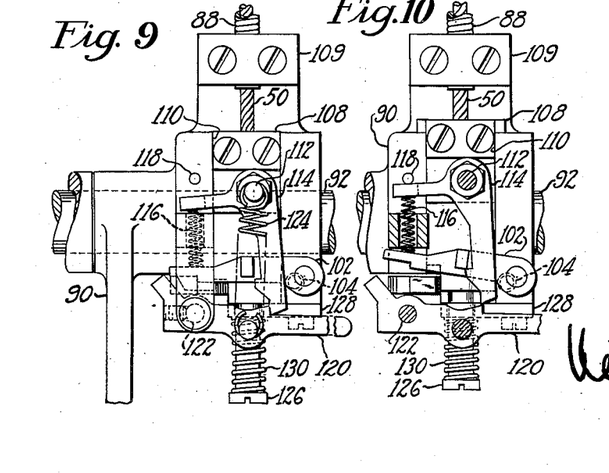
Fig. 9 is a view in front elevation of the cutting knife mechanism showing the construction of a manual safety release for said mechanism with the mechanism locked out of operation.
Fig. 10 is a similar view of the same parts, partly in section, showing their positions after the mechanism has been released for operation.

When the cable is released the slide block 108 is restored to its lowermost position, from that of Fig. 10 to that of Fig. 9. To this end the slide block has threaded into it a screw 126 passing loosely through a plate 128 on the support. Between the plate and the head of the screw 126 is wound a compression spring 130 acting to draw the slide block downwardly.

Unless the manually actuated latch 120 is pressed downwardly to release the hook member the knife actuating mechanism is held locked out. Accordingly, as the operator sees the end of the seam approaching he actuates the lockout latch 120 in ample time to enable four stitches to be inserted before the desired stopping point is reached.

As the machine comes to rest the vibrating lever 36 is moved rearwardly carrying the counting finger 64 with it. In starting the machine in operation on a new seam the lock bolt 38 is withdrawn from the vibrating lever and the setting arm 52 is depressed until it returns to the position of Fig. 11 with its upper end beneath the vibrating lever and in engagement with the rear surface of the carrier 40. During this downward movement the lug on the counting finger moves past the end of the latch 60 into a position where it will engage the latch for actuating the setting arm 52 when the counting finger moves rearwardly for the first time.

Figure 20:
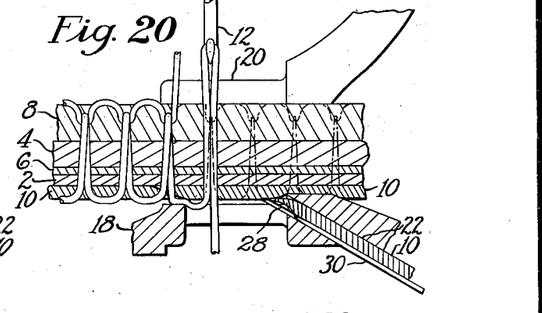
Fig. 20 is a similar view of the same parts taken during the insertion of the last and fourth stitch of a final series.

The operation of the machine will more readily be understood in connection with Figs. 16 to 21, inclusive. As the end of a seam indicated by the dot-dash lines is approaching (Fig. 16) the operator depresses the manually actuated lockout latch 120 to unlock the welt cutting knife actuating mechanism, setting it in readiness for operation at the proper time. The treadle is then released and during the next sewing cycle after the work support is back fed the knife 30 is actuated (see Fig. 17). It is thereafter quickly retracted, the work being fed a stitch length by the movement of the work support and presser foot while clamping the work in a position shown in Fig. 18. During this work feeding movement the welt is gripped and the severed end is disengaged from the end attached to the shoe. Upon the insertion of the next-to-last or third stitch of the final series of four which penetrates the beveled surfaces of the abutting welt ends the work support is again back fed a stitch length to the position of Fig. 19. Fig. 20 shows the position of the work during the final stitch under control of the stopping mechanism which coincides approximately with the first stitch of the seam (dot-dash lines) and which carries the exposed thread of the seam across the feather edge at the extreme final end of the welt. After the final stitch is completed the machine comes to rest and the presser foot is disengaged from the work, leaving the work in the position of Fig. 21, free to be withdrawn from the machine. The threads are then severed from the work by the operator and the work removed. After the presser foot is disengaged from the work the severed end of the welt remaining in the machine is advanced through the work support sufficiently to bring it into the path of the awl during the first penetrating stroke in a new seam.

Referring again to Figs. 11 to 15, inclusive, after the setting arm 52 is actuated to retract the cable 50 (Fig. 13) the counting finger 64 engages the rearward surface of the lock bolt carrier 40. In so doing a vertical abutment surface on the upper of a group of two detent surfaces 132 and 134 in the counting finger engages a corner 136 on the lock bolt carrier causing the vibrating lever 36 to move away from the counting finger 64. The counting finger being mounted on the lock bolt then moves a short distance upwardly with it until the detent surface 134 engages the corner 136. During the next rearward movement of the vibrating lever toward the solid line position of Fig. 11 the vibrating lever engages the second lower notch 76, as in Fig. 14, carrying the counting finger away from the lock bolt carrier. This occurs during the second sewing cycle of the four final cycle series of a seam. During the third cycle of the series the vibrating lever 36 again engages the counting finger as in Fig. 15 moving it rearwardly but without engaging either of the notches 74 and 76 so that the lock bolt 38 is free to rise with the counting finger until the lock bolt engages the opening in the vibrating lever. Thereafter, the machine is driven at low speed under control of the stopping mechanism through a complete final sewing cycle and brought to rest with the parts operated upon in the positions of Fig. 21.

Figures 13, 14, 15:
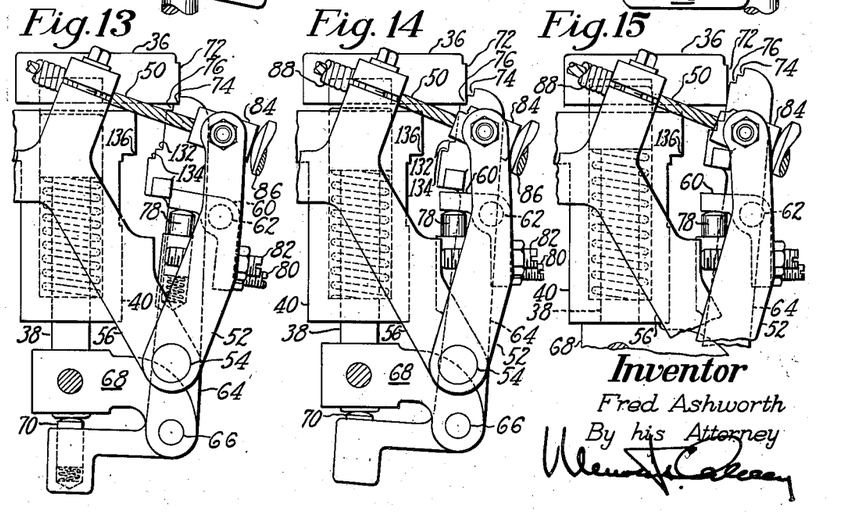
Fig. 13 is a detail side view of the same parts illustrated in positions assumed when the first stitch is completed in a final series of four after the control treadle is released.
Fig. 14 is a similar view of the same parts shown in positions assumed when the second stitch in the series has been completed after release of the control treadle.
Fig. 15 is a similar view of the same parts taken after the third stitch in the series has been completed.

To avoid resetting of the welt cutting knife actuating mechanism in readiness for operation during each rearward movement of the counting finger 64 after the first, the latch 60 (Figs. 11 to 15, inclusive) is so adjusted that after the first rearward movement of the counting finger the abutment thereon moves above the latch 60 as in Fig. 14 without actuating the setting arm 52. In starting the machine in operation the lock bolt and counting finger are drawn downwardly into the position of Fig. 11 so that the counting finger is again located beneath the plate 72 on the vibrating lever 36, enabling the counting operations to be repeated.

Figures 2, 3, 4, 5:
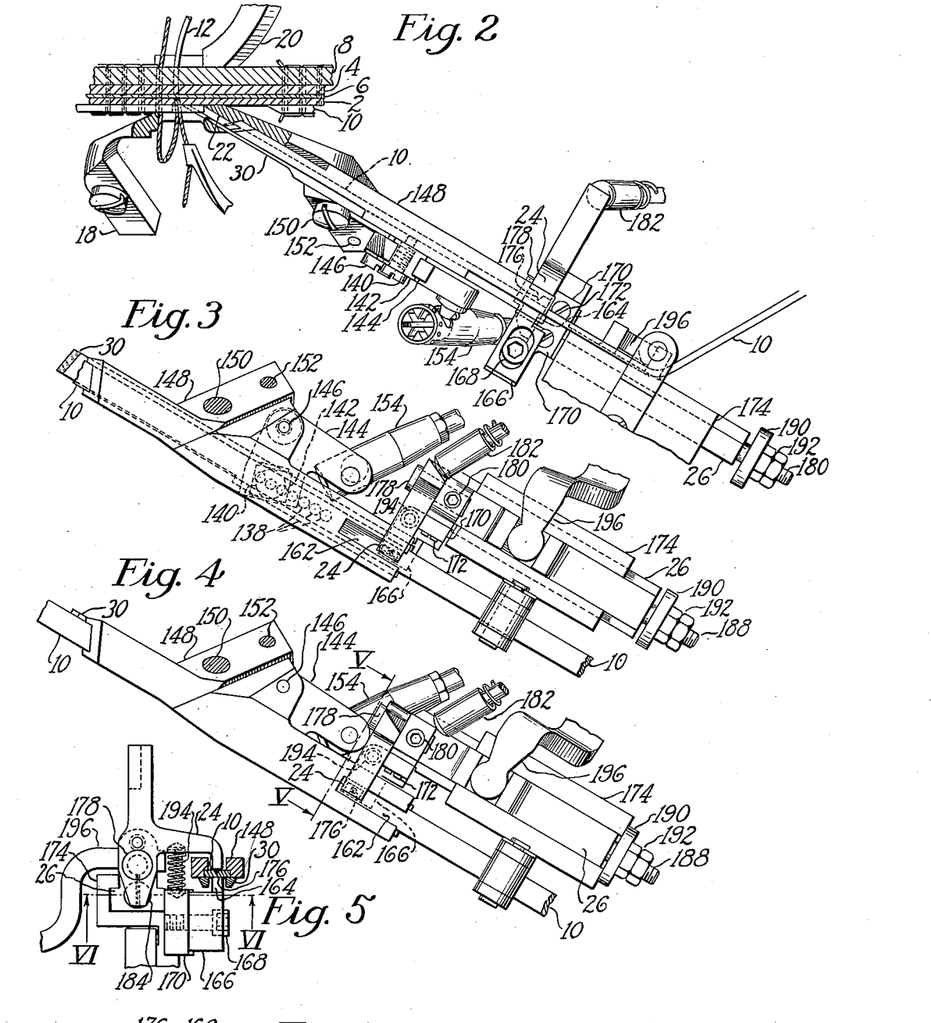
Fig. 2 is a detail view on an enlarged scale looking from a point slightly to the right of the front of the machine illustrated in Fig. 1, parts having been broken away and shown in section, including a portion of a shoe being operated upon.
Fig. 3 is a plan view of the parts illustrated in Fig. 2.
Fig. 4 is a similar view of the parts shown in positions after a welt strip has been advanced to bring its end into line with the operating point of the machine in starting a new seam.
Fig. 5 is a sectional view taken along the line V—V of Fig. 4.

The welt cutting knife 30 is best shown in Figs. 2 and 3 and consists of a thin blade slidingly mounted at its upper end to move within the welt guide 22. The slots 28 for both edges of the blade provided within the welt guide 22 maintain the knife in position against the lower surface of the welt guide. The knife has at its lower end a shank of greater thickness than the upper end of the knife and has formed along its shank a series of holes 138. Fitting within one of the holes 138 is the reduced end of a screw 140 threaded into a flanged block 142 between the flanges of which is disposed a forked lever 144 embracing the sides of the block. The lever 144 is pivotally mounted on a screw 146 carried by a bracket 148 forming a guideway for the knife 30 and providing a clearance space through which the welt 10 passes above the knife 30. The bracket 148 thus acts as an extension of the welt guide 22. The bracket 148 is secured to the work support 18 by a screw 150 and a dowel pin 152 passing through a rearward projection of the bracket 148 into engagement with the work support.

Figure 1:
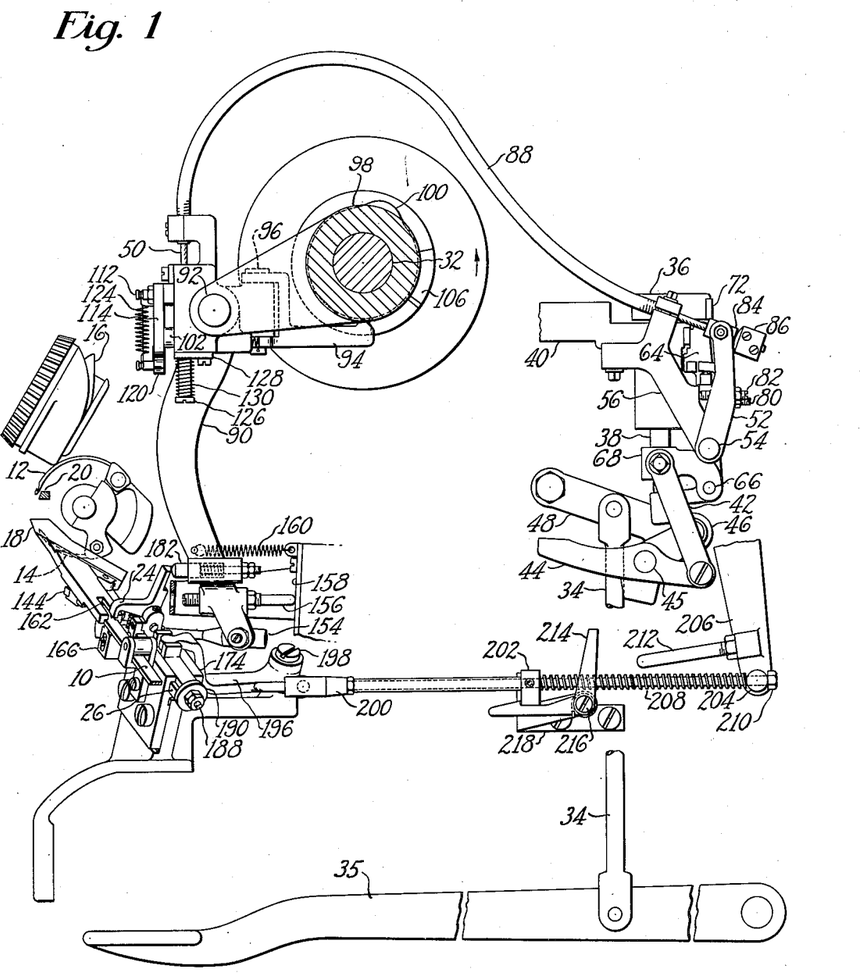
Fig. 1 is a view in side elevation partly in section of those parts of a shoe sewing machine which are necessary to illustrate the features of the present invention, the remaining parts having been omitted for purposes of clarity.

The lever 144 is actuated to reciprocate the knife by a link 154 having a ball and socket connection at either end, one of which operates the lever 144 and the other of which is operated by a downwardly extending arm of the support 90 (see Fig. 1). To locate the knife in its position retracted from the welt, the downwardly extending arm of support 90 has a set screw 156 threaded therein and provided with an elongated point engaging a plate 158 secured to the machine frame. To maintain the set screw 156 on the downwardly extending arm of the support 90 against the plate 158 a spring 160 is stretched between an eye on the plate and a pin on the arm.

Figures 18, 21:
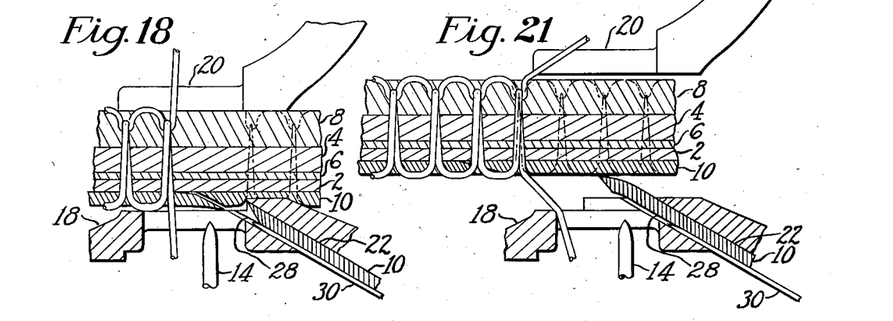
Fig. 18 is a similar view of the same parts taken after insertion of the second final stitch in the seam.
Fig. 21 is a similar view of the same parts taken during removal of a shoe, showing the severed end of the welt remaining in the machine advanced past the sewing point in readiness for a new sewing operation.
Figure 19:
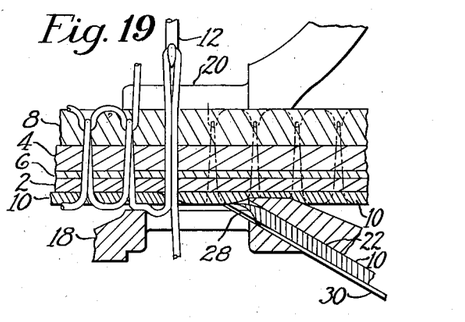
Fig. 19 is a similar view of the same parts taken during insertion of the third stitch in the series.

To grip the welt at a point within the guide of the bracket 148 to assist its being severed the bracket has slots 162 at its lower end, exposing the upper and lower surfaces of the welt 10. Acting through the slot 162 is a clamp comprising the movable jaw 24 and a cooperating jaw 164. The jaw 164 is relatively stationary and comprises an upwardly projecting flange on a block 166 secured by a bolt 168 to a right angle plate 170 having a horizontal portion fixed by screws 172 to the sliding block 26. The block 26 is mounted in a guideway 174 extending parallel to the welt 10, the arrangement being such that when the clamp 24, 164 grips the welt the clamp may be moved bodily with the welt to advance its severed end across the sewing point in preparation for the start of a new seam (Fig. 21). The movable jaw 24 is in the form of a lever having a downwardly toed finger provided with a prong 176. The jaw 24 is mounted for rotation on a headed stud 178 clamped by a set screw 180 in the sliding block.

The mechanism for actuating the welt clamp 24, 164 comprises an upwardly projecting arm of the jaw 24 engaged by a spring-pressed plunger 182 mounted in an opening in the downwardly extending arm of the support 90 (see Fig. 1). When the support 90 is actuated to cause the knife to sever the welt forward movement of the plunger presses the prong 176 into the welt, clamping it securely against the fixed jaw 164. In this way the welt is clamped during the time it is engaged by the knife, the plunger 182 yielding as the knife advances through the substance of the welt to complete its severance.

The clamp 24, 164 is retained in position until after the welt is severed and the last two stitches of a four final stitch series at the end of a seam. For retaining the grip on the welt while the final two stitches are being inserted, after the plunger 182 is retracted to its rearward position the movable jaw 24 is latched in welt clamping position. While the presser foot is being disengaged from the shoe at the end of a seam the latch is disabled. This is accomplished by engagement with a groove in a downwardly extending arm on the jaw 24 of a rib on a latch plunger 184 (see Fig. 6). The latch plunger 184 is slidingly mounted in the block 26 and is urged toward the jaw 24 by a compression spring 186 surrounding a rod 188 threaded into the plunger and projecting through a collar 190 at one end of the rod. To hold the collar on the rod a pair of check nuts 192 are threaded on the rod. When the sliding block 26 is being advanced to move the welt through the welt guide across the sewing point at the end of a seam the latch plunger 184 retains the jaw 24 in gripping engagement with the welt against the action of a spring 194 disposed between the plate 170 and the jaw 24. To disable the latch, the latch plunger is withdrawn from the jaw 24, the spring thereupon returning the jaw to open position and freeing the welt while the machine is being brought to rest.

Figure 6:
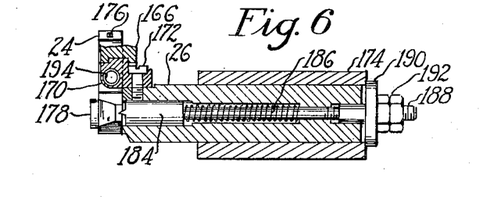
Fig. 6 is a sectional view taken along the line VI—VI of Fig. 5.

To advance the welt through the welt guide the sliding block 26 is actuated in the guideway 174 until the collar 190 engages the end of the guideway as illustrated in Figs. 4 and 6. Engagement of the collar 190 with the guideway stops the latch plunger 184 while the sliding block continues its movement, withdrawing the rib on the plunger from the groove in the jaw 24. The clamp 24, 164 then is returned to its starting position (see Figs. 2 and 3).

The sliding block 26 is actuated to advance the welt after the presser foot has released the shoe from the work support. The block 26 has a pair of upstanding lugs between which is disposed the circular head of a reversely bent lever 196 (see Figs. 1, 3 and 4). The lever 196 is fulcrumed on a screw 198 secured in the frame of the machine and has a laterally extending arm having a spherical head retained within a socket at the forward end of a rod 200. The rod 200 passes through an opening in a block 202 clamped to its central portion and at the rearward end of the rod it passes loosely through a stud 204 rotatably mounted in a downwardly extending arm of a lever 206 actuated by the stopping mechanism during the releasing movement of the presser foot as more fully explained in Patent No. 2,271,611. During the releasing movement of the presser foot the arm of lever 206 moves forwardly, causing the stud 204 to slide on the rod 200. Sliding movement of the stud on the rod 200 compresses a spring 208 coiled about the rod between the stud and the block 202, there being provided a check nut 210 at the end of the rod to prevent the rod from escaping from the stud. At the extreme forward end of the movement of lever 206 a pin 212 projecting from the downwardly extending arm of the lever engages the upwardly extending arm of a latch 214. The latch 214 is rotatable on a screw 216 threaded into a plate 218 on the machine frame. A hooked horizontal arm of the latch 214 engages the undersurface of the block 202 to retain the block 202 against movement by the spring 208 until the latch is engaged by the pin 212. This occurs during the last part of the presser foot releasing movement of the lever 206. When the machine is restarted the check nut 210 at the end of the rod 200 returns the rod to its latched position and restores the position of the sliding block 26 to that of Figs. 2 and 3.

The nature and scope of the invention having been set forth and a particular embodiment having been described, what is claimed is:

1. A machine for use in attaching a welt to a work piece having attaching and feeding devices, a guide mounted in the machine at a location where it directs the welt into a position on the work piece in advance of the operating point of the attaching devices, a main shaft operatively connected to the attaching and feeding devices, and a stop mechanism for bringing the main shaft to rest with the attaching devices disengaged from the work piece, in combination with a knife located in the machine for action between the welt guide and the point of operation of the attaching devices on the work piece to sever the welt along a portion thereof in contact with the work piece and mechanism operatively connected to the knife to actuate it in that part of an operating cycle of the attaching devices after the attaching devices have been disengaged from the work piece, and counting means having a counting finger with at least two detent surfaces operatively connected with the stop mechanism for preventing the machine from being brought to rest by the stop mechanism until two complete attaching cycles of operation defined by relative feed movement of the work piece and knife have been performed after the welt is severed.

2. A sewing machine for use in the manufacture of shoes of the stitchdown type having a needle and an awl, a main sewing shaft operatively connected to the needle and awl, a guide mounted in the machine at a location to direct a welt into a position on the shoe in advance of the operating point of the needle, a knife located in the machine for action along a portion of the welt in contact with the shoe, and a stop mechanism operatively connected to the sewing shaft for bringing it to rest with the needle and awl disengaged from the shoe, in combination with mechanism operatively connected to the sewing shaft for actuating the knife after that part of an operating cycle of the machine defined by the relative feed movement of the shoe and the knife in which the needle is disengaged from the work, and counting means having a counting finger with at least two detent surfaces for preventing the sewing shaft from being brought to rest by the stop mechanism until two stitches have been inserted after the welt is severed.

3. A machine for use in the manufacture of shoes of the stitchdown type having sole attaching devices, a guide for directing a welt into a position on the shoe in advance of the operating point of the attaching devices, and a knife constructed and mounted between the welt guide and the point of operation of the attaching devices to sever the welt along a portion thereof in contact with the shoe, in combination with clamp means for gripping the welt within the guide while being severed.

4. A machine for use in the manufacture of shoes of the stitchdown type having sole attaching devices, a guide for directing a welt into a position on the shoe in advance of the operating point of the attaching devices, and a knife constructed and mounted between the welt guide and the point of operation of the attaching devices to sever the welt along a portion thereof in contact with the shoe, in combination with means for gripping the welt within the guide while being severed, and mechanism for actuating the welt gripping means to cause the grip to be retained on the welt while one or more stitches are being inserted.

5. A machine for use in the manufacture of shoes of the stitchdown type having sole attaching devices, a guide for directing a welt into a position on the shoe in advance of the operating point of the attaching devices, a knife constructed and mounted to act on the welt between he guide and the point of operation of the attaching devices, and a work support and a presser foot for clamping the welt against the shoe during operation of the attaching devices, in combination with means for gripping the welt within the guide while being severed, and mechanism for actuating the gripping means to retain the grip on the welt while one or more stitches are being inserted and to release the welt after the presser foot has been disengaged from the work.

6. A machine for use in the manufacture of shoes of the stitchdown type having sole attaching devices, a guide for directing a welt into a position on the shoe in advance of the operating point of the attaching devices, and a knife constructed and mounted between the welt guide and the point of operation of the attaching devices to sever the welt along a portion thereof in contact with the shoe, in combination with means for gripping the welt within the guide while being severed, and mechanism for actuating the welt gripping means to cause the grip to be retained on the welt while one or more stitches are being inserted comprising a latch and connections actuated while the presser foot is being disengaged from the work at the end of a seam to disable the latch.

7. A machine for use in the manufacture of shoes of the stitchdown type having sole attaching devices, a guide for directing a welt into a position on the shoe in advance of the operating point of the attaching devices, and a knife constructed and mounted between the welt guide and the point of operation of the attaching devices to sever the welt along a portion thereof in contact with the shoe, in combination with means for gripping the welt within the guide while being severed, mechanism for actuating the knife and the welt gripping means, a latch for causing the grip to be retained on the welt while one or more stitches are being inserted, and means for disabling the latch when the machine comes to rest to enable the welt to be freed from the gripping means.

8. A machine for use in the manufacture of shoes of the stitchdown type having sole attaching devices, a guide for directing a welt into a position on the shoe in advance of the operating point of the attaching devices, and a knife constructed and mounted between the welt guide and the point of operation of the attaching devices to sever the welt along a portion thereof in contact with the shoe, in combination with means for gripping the welt within the guide while being severed, a knife constructed and mounted between the welt guide and the point of operation of the attaching devices to sever the welt along a portion thereof in contact with the shoe, and stopping mechanism for bringing the machine to rest at the end of a seam, in combination with means for gripping the welt and connections actuated by the stopping mechanism to cause the gripping means to advance the welt through the guide and free it while the machine is being brought to rest.

9. A sewing machine for use in the manufacture of shoes of the stitchdown type having stitch forming devices, a guide for directing a welt into a position on the shoe in advance of the sewing point, a presser foot for clamping the welt against the shoe during operation of the stitch forming devices, stopping mechanism for bringing the machine to rest at the end of a seam and for releasing the shoe from the clamping action of the presser foot, and a knife constructed and mounted between the welt guide and the point of operation of the stitch forming devices, in combination with a clamp for gripping the welt within the welt guide while being severed, and connections actuated by the stopping mechanism for freeing the welt from the grip of the clamp.

10. A sewing machine for use in the manufacture of stitchdown shoes having stitch forming devices, a guide for directing a welt into a position on the shoe in advance of the sewing point, a presser foot for clamping a welt against the shoe during operation of the stitch forming devices, and a knife constructed and mounted to act on the welt between the welt guide and the point of operation of the stitch forming devices, in combination with mechanism for actuating the knife to sever the welt, and a clamp actuated by said mechanism before the knife engages the welt to grip the welt from movement as the knife acts.

11. A sewing machine for use in the manufacture of stitchdown shoes having stitch forming devices, a guide for directing a welt into a position on the shoe in advance of the sewing point, a presser foot for clamping a welt against the shoe during operation of the stitch forming devices, a clamp for gripping the welt, and a knife constructed and mounted to act on the welt between the clamp and the point of operation of the stitch forming devices, in combination with mechanism for actuating the clamp to grip the welt and thereafter to cause the knife to sever the welt.

12. A sewing machine for use in the manufacture of shoes of the stitchdown type having stitch forming devices, a guide for directing a welt into a position on the shoe in advance of the sewing point, a presser foot for clamping the welt against the shoe during operation of the stitch forming devices, stopping mechanism for bringing the machine to rest at the end of a seam and for releasing the shoe from the clamping action of the presser foot, and a knife constructed and mounted between the welt guide and the point of operation of the stitch forming devices, in combination with a clamp for gripping the welt, and counting means actuated by the stopping mechanism for causing the clamp to grip the welt and thereafter for actuating the knife to sever the welt.

13. A sewing machine for use in the manufacture of shoes of the stitchdown type having stitch forming devices, a guide for directing a welt into a position on the shoe in advance of the sewing point, a presser foot for clamping the welt against the shoe during operation of the stitch forming devices, stopping mechanism for bringing the machine to rest at the end of a seam and for releasing the shoe from the clamping action of the preser foot, and a knife constructed and mounted between the welt guide and the point of operation of the stitch forming devices, in combination with a clamp for gripping the welt, and counting means actuated by the stopping mechanism for causing the clamp to grip the welt, the knife to sever the welt and for bringing the machine to rest after four stitches are inserted.

14. A sewing machine for use in the manufacture of shoes of the stitchdown type having stitch forming devices, a guide for directing a welt into a position on the shoe in advance of the sewing point, a presser foot for clamping the welt against the shoe during operation of the stitch forming devices, stopping mechanism for bringing the machine to rest at the end of a seam and for releasing the shoe from the clamping action of the presser foot, and a knife constructed and mounted between the welt guide and the point of operation of the stitch forming devices, in combination with a clamp for gripping the welt, counting means actuated by the stopping mechanism for causing the clamp to grip the welt and thereafter for actuating the knife to sever the welt, and manually controlled means for rendering the counting means inoperative.

FRED ASHWORTH.

REFERENCES CITED

The following references are of record in the file of this patent:

UNITED STATES PATENTS

| Number | Name | Date |
| --- | --- | --- |
| 2,388,244 | Ashworth | Nov. 6, 1945 |
| 2,388,245 | Ashworth | Nov. 6, 1945 |